Oct. 28, 1924.
P. A. F. CAYLA
1,513,219
CONTROL DEVICE FOR BRAKES UPON THE FOUR WHEELS OF VEHICLES
Filed Feb. 21, 1923 — 2 Sheets-Sheet 2
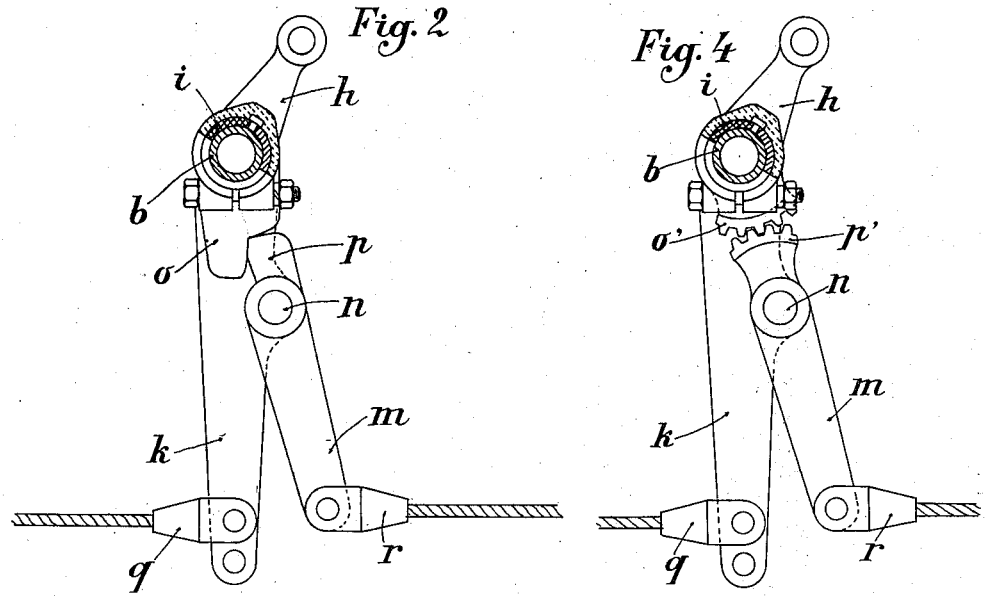
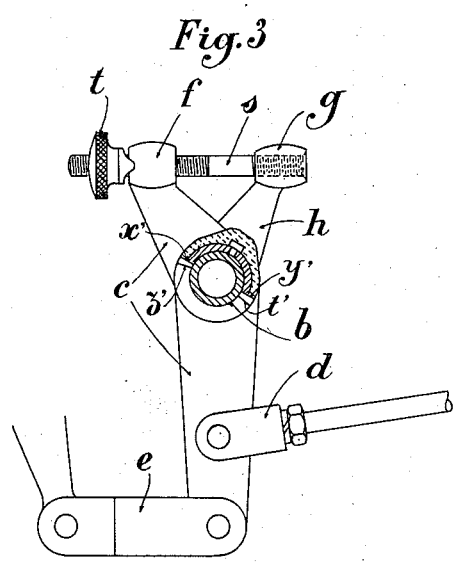
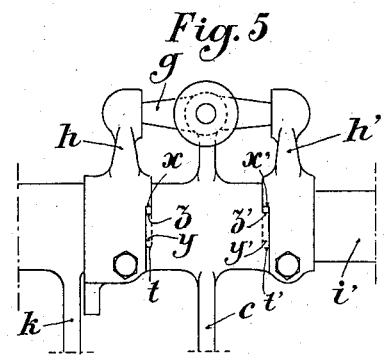
Pierre Amédée Firmin CAYLA
INVENTOR
his Atty.

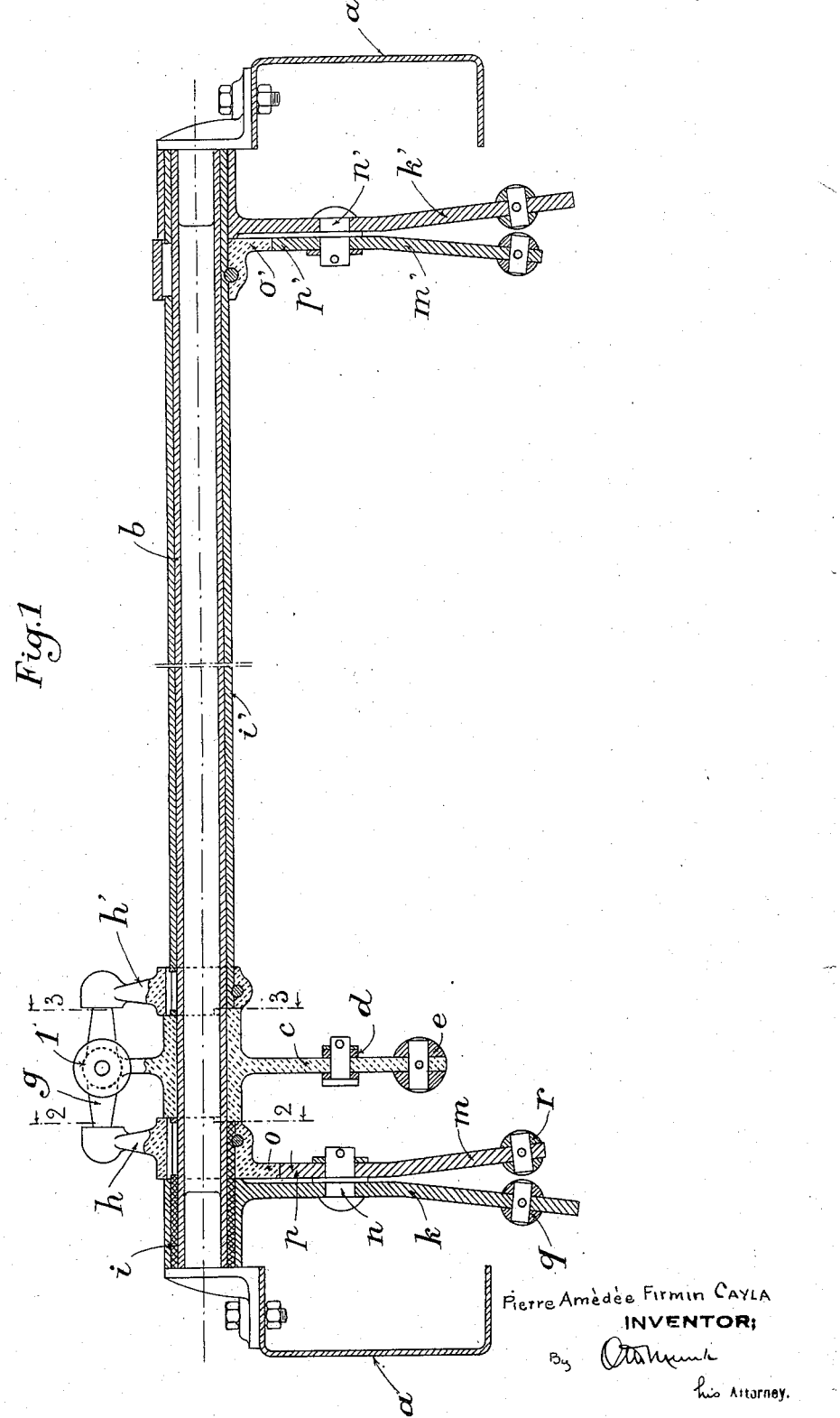

Patented Oct. 28, 1924.

1,513,219

UNITED STATES PATENT OFFICE.

PIERRE AMÉDÉE FIRMIN CAYLA, OF PARIS, FRANCE, ASSIGNOR TO SOCIETE ANONYME DES AEROPLANES G. VOISIN, OF SEINE, FRANCE.

CONTROL DEVICE FOR BRAKES UPON THE FOUR WHEELS OF VEHICLES.

Application filed February 21, 1923. Serial No. 620,451.

*To all whom it may concern:*

Be it known that I, PIERRE AMÉDÉE FIRMIN CAYLA, citizen of the French Republic, residing at Paris, in the French Republic, have invented new and useful Improvements in Control Devices for Brakes upon the Four Wheels of Vehicles, of which the following is a specification.

The present invention relates to a control device for braking the four wheels of a vehicle by the direct action of the brake pedal without the interposition of the transmission generally used to transmit this action to brakes placed on either side of the said pedal.

According to this invention, the brake pedal and hand lever actuate two secondary pivoting levers by means of a swing bar connection, each of said secondary levers being adapted to actuate a receiving lever connected with a front brake, said receiving lever being pivoted on a second receiving lever pivoting about the same axis than the corresponding secondary lever and being connected with a rear brake.

An important advantage afforded by this arrangement resides in that the braking action is equivalent on the four wheels.

In the appended drawing which shows by way of example an embodiment of the invention:

Fig. 1 is a section of the device on a vertical plane perpendicular to the axis of symmetry of the vehicle;

Fig. 2 is a section view along line 2—2 Fig. 1.

Fig. 3 is a section view along line 3—3 Fig. 1.

Fig. 4 is a section view analogous to Fig. 2, showing a modification in the device.

Fig. 5 is an elevation view of part of the device according to Figs. 1 to 3.

A tube or shaft $b$, about which a double arm actuating lever $c$ is adapted to pivot, is secured at both ends to the longitudinals $a$ of the vehicle; the lever $c$ is connected at one end to the brake pedal by the rod $d$ and to the hand lever by the link $e$.

The other end $f$ of said lever $c$ controls through the intermediary of a small transverse swinging bar $g$, two other small swing levers $h$ and $h'$ which are also rotatable about the shaft $b$. The tubes $i$ and $i'$ surround the shaft $b$ and the lever $h$ is keyed to the tube $i$ and the lever $h'$ to the tube $i'$.

The lever $h$ controls the front and rear brakes on the left hand side by means of a set of receiving levers $k$ and $m$, whilst the lever $h'$ controls the front and rear brakes on the right hand side by means of a set of receiving levers $k'$ and $m'$.

The lever $k$ is mounted loose on the shaft $b$ and a lever $m$ is pivoted on a pivot pin $n$ parallel to the shaft $b$ and rigidly secured on the lever $k$. The lower end of said lever $k$ is connected with the rear brake on the left, while the lower end of the lever $m$ is connected with the front brake also on the left.

Moreover, the lever $h$ is adapted to act by its nose $o$ upon the end $p$ of the lever $m$.

A similar arrangement comprising the levers $k'$ and $m'$ is provided at the other end of the shaft $b$, the only difference being that the nose piece $o'$ instead of being a part of the lever $h'$, makes part of a collar keyed upon the tube $i'$ controlled by the lever $h'$. Said nose piece $o'$ is adapted to act upon the end $p'$ of the lever $m'$.

The operation of the device is as follows:

When the driver actuates the brake pedal or the hand lever, the lever $c$ is caused to rotate about the shaft $b$ and drives the two levers $h$ and $h'$ by the intermediary of the swing bar $g$. The lever $h$ is thus actuated and its nose piece $o$ bearing against the end $p$ of the lever $m$ causes the rotation of the whole of the levers $k$ and $m$ about the common shaft $b$.

The rotation of the lever $k$ produces the throwing on of the rear left-hand brake by means of the cable $q$. The resistance due to the braking will now set the lever $k$ in a substantially fixed position, and the rotation of the lever $m$ about the pivot pin $n$ takes place, from this moment, in contrary sense to that of the lever $h$, since the nose $o$ whose profile corresponds to that of the end $p$ of the lever $m$, goes on acting on said end $p$. The rotation of the lever $m$ thus causes the throwing on of the front left hand brake, by means of the cable $r$, and this is thus obtained by using as a support the resistance due to the throwing on of the rear brake. The effects on the wheels on the same side are thus equivalent. On the other hand, as the pedal actuates the levers $h$ and $h'$ by means of a swing bar, the effects on the four brakes are identical, since the operation (for the right-hand wheels) of the levers $k'$ and $m'$ is the same as that of the levers $k$ and $m$ for the left-hand wheels.

The end of the lever $c$ is connected with the swing bar $g$ by a screwthreaded rod $s$ and an adjustable nut $t$ which is located within reach of the driver who can thus readily carry out from his place the adjustment of the whole control.

In order that the rupture of any one of the control cables shall not prevent (by reason of the swing bar connections) the action of the other cables, stop pieces are provided on the levers $h$ and $h'$ for limiting the oscillation of the swing bar arrangement, so that the rupture of one of the cables shall only annul the braking action on two of the wheels.

These stop-pieces are shown more clearly on Figs. 3 and 5. The collar of each swing lever $h$, $h'$ has one of its annular side faces disposed in two different parallel planes so as to form stops $x$, $y$, and $x'$, $y'$ respectively. The two side faces of the collar of actuating lever $c$ is provided in the same manner with stops $z$, $t$ and $z'$ $t'$ disposed opposite the first stops but so as to allow a certain play between the lever $c$ and the levers $h$, $h'$. It is this play which permits of a certain swinging of the lever $h$ with respect to the lever $h'$. In case one of the control cables should break, for instance a cable controlled by lever $h$, the latter will be allowed to rotate freely, and lever $c$ will rotate until its stop $z'$ abuts against stops $x'$ of lever $h'$; from this moment the levers $c$ and $h'$ will act as if they form only one piece, without any relative swinging with regard to each other, so that lever $h'$ will be controlled directly by lever $c$, without the medium of the swinging bar $g$. The same is true for lever $h$ and lever $c$, in case a control cable actuated by lever $h'$ should break.

Various constructional modifications may obviously be made in the device described without departing from the principle of the invention. In particular, the action of the lever $h$ upon the whole of the two double levers $m$ and $k$ can take place for instance by means of two toothed quadrants $o'$, $p'$ (Fig. 4), whereby the lever $m$ can be rotated about the pivot pin $n$ in the proper direction.

Having now described my invention, I declare that what I claim as new and desire to secure by Letters Patent is:

1. In a control device for brakes upon the four wheels of a vehicle the combination with a vehicle frame, front brakes and rear brakes, of a transverse shaft secured to the vehicle frame, an actuating member, two swing levers adapted to pivot about said shaft, means including a swing bar for operatively connecting said swing levers to said actuating member, two receiving levers adapted to be respectively actuated by the said swing levers and respectively connected with a front brake and with a rear brake of one side of the vehicle, each rear brake receiving lever being mounted loose on said shaft and each front brake receiving lever being pivotally mounted on the corresponding rear brake receiving lever.

2. In a control device for brakes upon the four wheels of a vehicle the combination with a vehicle frame, front brakes and rear brakes, of a transverse shaft secured to the vehicle frame, an actuating member, an actuating lever pivoted about said shaft and controlled by said actuating member, two swing levers pivotally mounted on said shaft on either side of said actuating lever, a swing bar mounted on said actuating lever and adapted to actuate both swing levers at the same time, two receiving levers mounted loose on said shaft and respectively connected with a rear brake, two other receiving levers respectively connected with a front brake, each of said front brake receiving levers being pivotally mounted on the corresponding rear brake receiving lever, and means for operatively connecting each swing lever to one of said front brake receiving levers.

3. In a control device for brakes upon the four wheels of a vehicle the combination with a vehicle frame, front brakes and rear brakes, of a transverse shaft secured to the vehicle frame, an actuating member, an actuating lever pivoted about said shaft and controlled by said actuating member, two swing levers pivotally mounted on said shaft on either side of said actuating lever, a swing bar mounted on said actuating lever and adapted to actuate both swing levers at the same time, two receiving levers mounted loose on said shaft and respectively connected with a rear brake, two other receiving levers respectively connected with a front brake, each of said front brake receiving levers being pivotally mounted on the corresponding rear brake receiving lever, means for operatively connecting each swing lever to one of said front brake receiving levers and stop pieces provided on each of said two swing levers and on the actuating lever for limiting the relative rotation of these three levers.

4. In a control device for brakes upon the four wheels of a vehicle the combination with a vehicle frame, front brakes and rear brakes, of a transverse shaft secured to the vehicle frame, an actuating member, an actuating lever pivoted about said shaft and controlled by said actuating member, a screwthreaded rod extending through said actuating lever, a nut screwed on one end of said rod and against which said actuating lever may abut, a transverse swing bar secured at the other end of said rod, two swing levers adapted to be actuated by said transverse bar and pivotally mounted on said shaft on either side of said actuating lever, two receiving levers mounted loose on said shaft and respectively connected with a rear brake, two other receiving levers respectively connected with a front brake, each of said front brake receiving levers being pivotally mounted on the corresponding rear brake receiving lever, and means for operatively connecting each swing lever to one of said front brake receiving levers.

In testimony whereof I have signed my name to this specification.

PIERRE AMÉDÉE FIRMIN CAYLA.